United States Patent

Gross

[11] Patent Number: 5,529,730
[45] Date of Patent: Jun. 25, 1996

[54] METHODS AND APPARATUS FOR CONTROLLING THE BEAD HEIGHT IN A PLASTIC WEB EXTRUDER

[76] Inventor: Heinz Gross, Ringstrasse 137, D-64380 Rossdorf, Germany

[21] Appl. No.: 387,772
[22] PCT Filed: Sep. 13, 1993
[86] PCT No.: PCT/DE93/00842
    § 371 Date: Feb. 21, 1995
    § 102(e) Date: Feb. 21, 1995
[87] PCT Pub. No.: WO94/06616
    PCT Pub. Date: Mar. 31, 1994

[30] Foreign Application Priority Data

Sep. 13, 1993 [DE] Germany ............ 92 12 406.2 U

[51] Int. Cl.⁶ .................... B29C 47/92; B29C 39/44
[52] U.S. Cl. ................. 264/40.100; 264/40.7; 264/210.2; 264/216; 425/135; 425/145; 425/327; 425/363
[58] Field of Search .................... 264/40.1, 40.2, 264/40.7, 176.1, 216, 210.2; 425/363, 327, 141, 145, 135

[56] References Cited

U.S. PATENT DOCUMENTS

| 3,962,580 | 6/1976 | Maier et al. |
|---|---|---|
| 4,490,612 | 12/1984 | Törmälä |
| 4,692,026 | 9/1987 | Gawrisch et al. |
| 4,755,127 | 7/1988 | Becker ................. 264/40.2 |
| 4,858,139 | 8/1989 | Wirtz .................. 264/175 |
| 4,909,630 | 3/1990 | Gawrisch et al. |
| 5,094,790 | 3/1992 | Halter ................. 425/141 |
| 5,149,481 | 9/1992 | Gross et al. ............ 264/40.7 |
| 5,158,724 | 10/1992 | Yagi et al. ............. 425/141 |
| 5,262,101 | 11/1993 | Yagi et al. ............. 425/141 |
| 5,286,436 | 2/1994 | Funk et al. ............ 264/210.2 |

FOREIGN PATENT DOCUMENTS

| 0211989 | 3/1987 | European Pat. Off. ....... 264/40.7 |
|---|---|---|
| 2338305 | 2/1975 | Germany . |
| 2453443 | 5/1976 | Germany ................. 425/141 |
| 3843300 | 7/1989 | Germany . |
| 9208837 | 12/1992 | Germany . |
| 851420 | 8/1994 | Greece . |
| 60-210418 | 10/1985 | Japan . |
| 2-194917 | 8/1990 | Japan ................... 425/141 |
| 3-286830 | 12/1991 | Japan ................... 425/141 |
| 89/10834 | 11/1989 | WIPO . |

OTHER PUBLICATIONS

Article: "Measurement and Control of Coextruded Coating by Infrared Analysis", wm. Van Horne, Tappi vol. 58, No. 4 (Apr. 1975) pp. 111–114.

Article: "White–Light Interferometric Thickness Gauge", P. Flournoy et al, Applied Optics, vol. 11, No. 9 (Sep. 1972) pp. 1907–1915.

Primary Examiner—Jeffery R. Thurlow
Attorney, Agent, or Firm—Burns, Doane, Swecker & Mathis

[57] ABSTRACT

A plastic web is formed by introducing flowable plastic material to an upper inlet side of a nip formed by a pair of rolls to form a bead of the material at the inlet side, while removing the web from a lower outlet side of the nip. The birefringence of the web is measured at points across the web width, and the rate of plastic introduced to the nip inlet side is regulated in accordance with the measured birefringence to form a substantially uniform bead height along the nip inlet side.

10 Claims, 2 Drawing Sheets

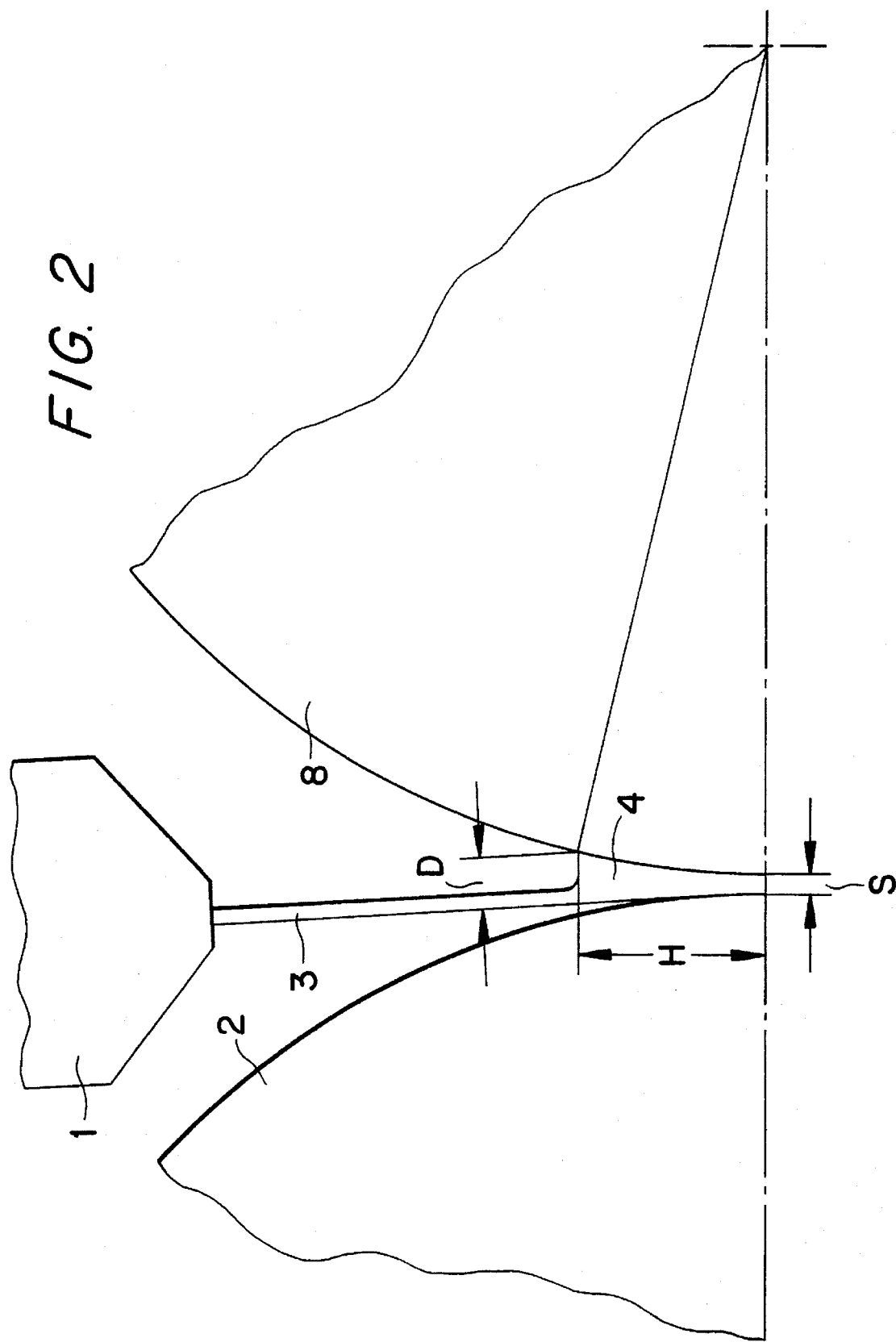

METHODS AND APPARATUS FOR CONTROLLING THE BEAD HEIGHT IN A PLASTIC WEB EXTRUDER

BACKGROUND AND OBJECTS OF THE INVENTION

1. Field of the Invention

This invention relates to a method for controlling the bead size in the nip of glazing rolls used in the extrusion of thin-walled plastic webs having smoothed surfaces on both sides by continuous measuring of the birefringence in orientation at various points over the width of the extruded plastic web. This allows exact controlling of the throughput of the nozzle connected to the extruder, provided that the nip is fully constant over the width of the glazing rolls.

2. Background art

One of the main aims in producing extruded plastic webs, for instance from thermoplastic materials, is to achieve a thickness as uniform as possible and a homogeneous characteristic curve over the whole surface of the web. This applies in particular to plastic films i.e. plastic webs of a thickness of less than 2 mm.

The main reason for irregularities in plastic webs are variations over the width of the outlet gap of the melt stream emerging from the sheet die. Assuming a parallel nip between the glazing rolls, such variations in the melt stream inevitably result from differences in the height of the melt stock—in the following referred to as "bead"—in the roll nip. Differences in the bead size involve varying pressures in the roll nip and thus differing melt stream rates. This inevitably leads to differences in the thickness of the final product. In case of too big beads so-called bead rolls develop on the web surface and in case of no bead there is normally no contact between the plastic melt and the surface of at least one glazing roll. At such spots, the nominal thickness of the web falls short of the desired value. Constant controlling and adjusting of the bead during extrusion is of great assistance therefore. DE-OS 35 43 632 discloses a method using a time-limit relay to determine thickness and orientation of plastic films by means of polarized light.

Numerous publications deal with the determination of film thickness by the infrared absorption spectroscopy the principles of which are described by W. E. Van Horne (Tappi 58(4), pages 111 to 114, 1975). DE-OS 32 30 442 desribes a method which eliminates errors of measurements in the determination of film thickness by means of the infrared absorption spectroscopy which may be caused by inhomogeneities in the film material for instance. In Applied Optics 11(9), pages 1907 to 1915 (1972), P. A. Flurnoy et al. introduce a device to determine the thickness of films and their coatings by means of interferometry. Such device can be used to determine the thickness of freely running films by transmission or reflexion. The basic design includes a light force providing a continuous spectrum, the light of which is reflected on the front and rear sides of the film to be measured. The resulting phase difference which is proportional to the film thickness is determined in a Michelson interferometer.

A continuous and non-contact measuring method to determine the thickness of electrical non-conductive materials, in particular webs of polymer materials, is described in DE-OS 40 11 646. This method uses an air stream caused by an atmospheric pressure to detect a specific distance between the measuring probe and the material web.

DE-OS 36 31 652 discloses a measuring arrangement for a non-destructive and non-contact thickness determination of films and thin surface coatings by means of instationary heat conduction.

Another measuring device to determine the thickness of films and in particular of plastic films is described in DE-OS 38 43 300 and comprises, among other parts, a roll on which the film abuts over part of its circumference and a light ray which is glidingly and tangentially passed by that section of the roll where the film abuts, characterized in that the light ray behind the roll is measured over its total width by means of a light sensor. All aforementioned methods only determine the thickness distribution of a plastic web without allowing conclusions to the reasons.

Greek Document 85,1420 discloses a method and apparatus for the production of extruded and smoothed plastic webs by extruding a thermoplastic moulding material using a sheet die and smoothing the extruded melt web by forming a bead of the thermoplastic moulding material in front of the nip of the glazing rolls. The size of the bead is determined by measuring the web's surface temperature on leaving the roll nip. In case the nominal temperature of the film surface ensuring a constant operating condition in continuous operation is exceeded, the melt throughput will be increased and in case it falls short, reduced. This eliminates the surface interferences occurring with no bead or with varying bead sizes.

In G 92 08 837.6 apparatus is described to eliminate the influence of a roll which is out of truth on the control of the thickness distribution of an extruded surface-smoothed sheet. The characteristical features, traversing bead size measuring and/or traversing sheet thickness measuring, ensure a uniform bead profile at the glazing roll mechanism. This information is made use of to control the melt stream emerging from the nozzle.

The methods referred to as prior art to determine the thickness of extruded plastic webs or sheets do not allow direct use for an automatic control of the local melt stream emerging from the nozzle because the thickness variations measured therewith may have been caused by other reasons than melt stream fluctuations. They may, for instance, be a consequence of roll deflections caused by high pressures at the roll nip or by ovalities of a roll originating from production. The use of a sheet thickness measuring device to control the melt stream emerging from the nozzle is therefore most questionable when producing smoothed webs.

GR 85.1420 describes a method for controlling the nozzle by means of measuring the bead height. The measuring method used therein which determines the web surface temperature does not sufficiently detect very small differences in bead size as particularly common in the production of very thin-walled films, however. Because of the traversing way of measuring, possible thickness variations in the direction of extrusion caused, for instance, by an untrue glazing roll may moreover be misinterpreted as thickness variations over the width.

The method described in G 92 08 837.6 at least allows an elimination of the problem of thickness variations caused by glazing rolls which became deformed. The fact that the measurement is taken twice, offset by half of the roll circumference, and averaged allows a compensation of the sinus-shaped measurement fluctuations in the extrusion direction caused by deformed rolls.

SUMMARY OF THE INVENTION

The aim of the present invention was to develop apparatus to determine the bead height in the roll nip in the extrusion of surface-smoothed transparent plastic webs.

According to the invention, the aforesaid aim is met by apparatus having at least one sensor to measure the birefringence in orientation on the extruded web after leaving the glazing rolls in a temperature range beneath the glass transition temperature of the plastic and a computer converting the measured values into bead heights in accordance with given algorithms. The signal for the control of the melt stream emerging from the nozzle which is given by the measuring sensor and processed in the computer is preferably used over the width of the extrusion nozzle to set a uniform bead height throughout the width of the glazing rolls. Another aim of the invention was to develop a novel method to produce thin webs smoothed on both sides from thermoplastic materials, using an extruder to melt and convey the granular material, a sheet die to mould the melt, a glazing roll mechanism to cool and smoothen the melt, and a haul-off to draw off the web, allowing the manufacture of webs of an improved characteristic curve.

According to the present invention, the aforesaid aim is met by measuring the birefringence existing in the web at several points over the width of the web after leaving the glazing rolls, feeding the measured values into a controller which calculates control values in accordance with the measured differences, conveying said control values to adjusting means distributed over the width of the extrusion nozzle, these adjusting means changing the flow channel resistance inside the nozzle to an extent given by the control values, thus achieving a uniform bead height in the roll nip. The birefringence in orientation on the extruded plastic web can preferably be determined by a traversing measuring sensor, such sensor detecting the values at places offset by half of the roll circumference and the average of these two measurements being used as reference input for the controller. Another alternative is to provide several measuring sensors in a line perpendicular to the web extrusion direction to determine the birefringence in orientation on the extruded plastic web, such measuring sensors determining the birefringence in orientation simultaneously at different points over the width of the plastic web and feeding the measured values into the controller. This method is particularly suitable for plastic webs containing some parts of aromatics like polystyrene or polycarbonate for instance, and of a thickness ranging between 0.05 and 2 mm.

BRIEF DESCRIPTION OF THE DRAWINGS

The objects and advantages of the invention will become apparent from the following detailed description of a preferred embodiment thereof in connection with the accompanying drawing in which like numerals designate like elements, and in which:

FIG. 2 is an enlarged side view of the nip area of the glazing rolls.

DETAILED DESCRIPTION OF A PREFERRED EMBODIMENT OF THE INVENTION

Figure 1:
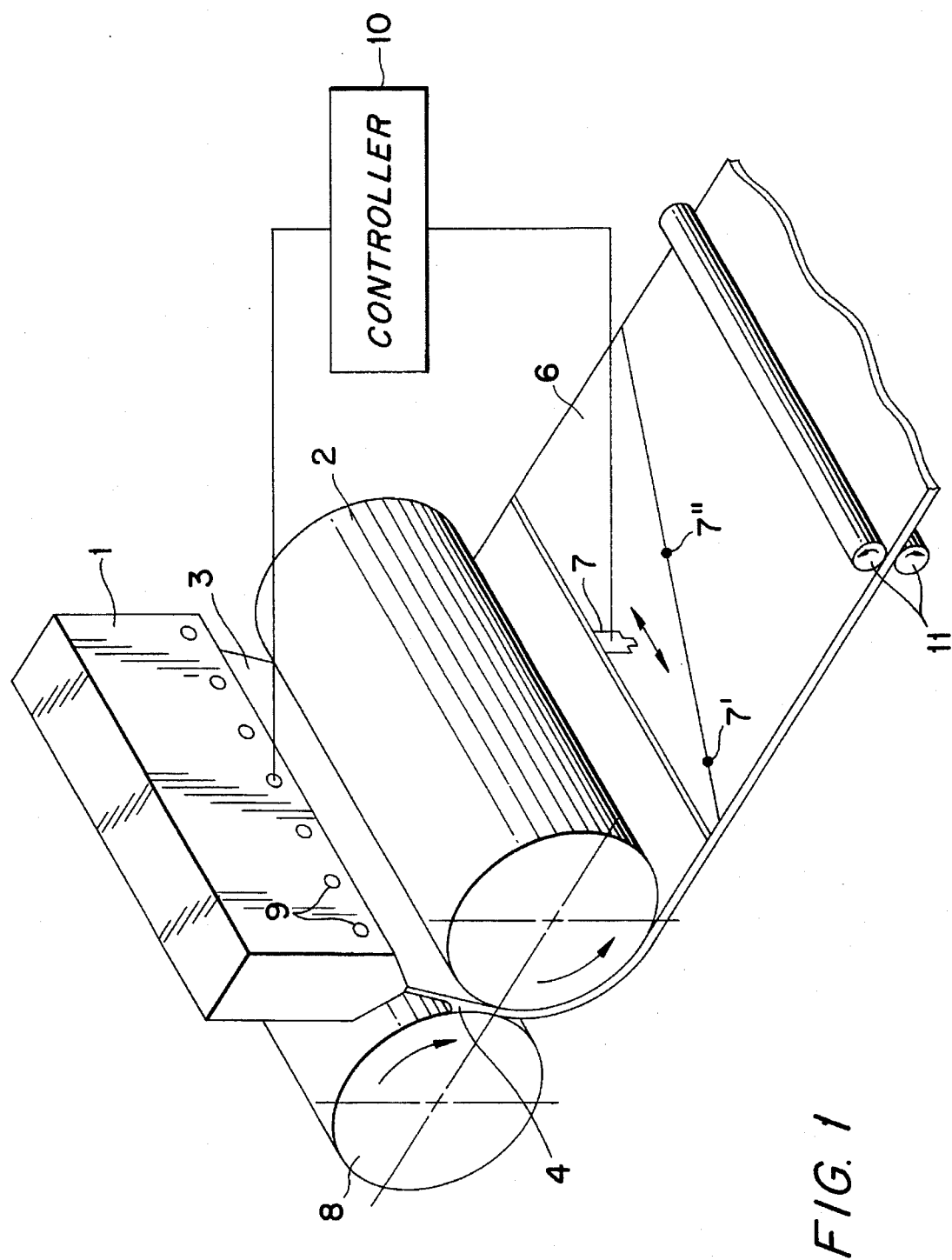
FIG. 1 is a perspective view of apparatus according to the invention.

A polymer melt 3 emerging from an extrusion nozzle 1 is led onto glazing rolls 2, 8 for cooling and smoothing of its surfaces and drawn off again by a haul-off 11. Simultaneously, a melt bead 4 develops. Local fluctuations in the bead height H which may be caused by local differences in the melt stream of the polymer melt 3 leaving the extrusion nozzle 1, produce variations in the pressure distribution in the area of bead 4 or the roll nip. This automatically results in differences in the velocity distribution of the melt passing through the roll nip. Changes in the velocity distribution in turn cause differences in the molecular orientations frozen in the web.

As a result of the correlations described above, it is possible to generate measuring signals for differences in the bead height H which are optically not noticeable any more by measuring the birefringence in orientation over the width of a web 6, for instance by means of a measuring sensor 7 traversing the web 6. Such measuring signals are used for a local control of the polymer melt stream 3 at the exit of extrusion nozzle 1, which is possible by setting elements 9 located in the extrusion nozzle 1 and automatically controlled by means of hot-ductile bolts or actuators, for instance.

Should there be different bead heights over the width of the glazing rolls, for instance, the places with higher bead would therefore show higher birefringence values because of the fact that higher pressure in the roll nip causes greater orientation of the polymer molecules in the extrusion direction. Such differences can be measured and recorded by radiation with linearly polarized light (compare: Vieweg/Braun, Kunststoff-Handbuch, Volume 1, pages 193 ff, Carl Hanser, Munich Vienna, 1975).

Cooling of the melt web on glazing or cooling rolls causes very rapid freezing of such orientations so that there is hardly any relaxation possible. In the specific case of the thickness of the melt web 3 being equal to the nip size S of the glazing rolls there will be no new molecular orientating, for instance, as the melt passes through the nip in a block-shaped velocity distribution. This happens when glazing roll 8 is only in linear contact with the web or, in other words, when there is no bead 4 at all.

In this case the melt flows in a block-shaped velocity distribution through the roll nip. That means the melt throughout its volume passes through the roll nip at exactly the same rate as the circumferential speed of the glazing or cooling rolls. The resulting birefringence is extremely low because there is no relative speed of the melt in the nip area and thus no molecular orientation. As soon as a bead develops in the roll nip, the flow profile in the nip changes into a parabolic one and birefringence in orientation increases with increasing bead size. The greater the difference between bead thickness D and roll nip S, the greater is the orientation of the polymer molecules, consequently.

The controller 10 converts the measured values of local birefringence 7', 7" into control commands. The polymer melt stream is then corrected at the corresponding positions inside the extrusion nozzle 1, which may, for instance, be done by changing the lip gap by means of the controllable setting elements 9 of the nozzle. The method according to the invention is suited for the production of plastic webs made from transparent plastic materials, in particular of those having a high intrinsic birefringence like polycarbonate, polystyrene, polybutyleneterephtalate or others, some parts of which are aromatics (for their processing also refer to E. C. Bernhardt, Processing of Thermoplastic Materials, Reinhold Publishing Corporation, N.Y., 1959).

Preferred Effects of the Invention

The traversing measuring device 7 to measure the birefringence in orientation on an extruded web supplies measuring values which are proportional to the melt stream variations. Such values are compared to the preset nominal values in the controller 10. The controller 10 then calculates the control values which are used to reset the relative adjusting screws 9 on the nozzle. This allows setting of an extremely constant profile of bead height H, which results in an extremely uniform thickness of the extruded surface-smoothed web. The use of birefringence in orientation as a reference input for the control action has further process-related advantages. As there is a correlation between birefringence in orientation and mechanical properties of the web, this way of proceeding automatically entails a largely constant characteristic curve in webs produced in this way. In the production of sub-stratums for optically readable disks this method quasi guarantees that the required small phase differences can be adhered to. For such cases one should always make use of this technology.

EXAMPLE

Extrusion of a film from bisphenol A polycarbonate

The melt temperature at the exit of extrusion nozzle 1 amounts to 280° C. The melt is cooled on chrome-plated rolls 2, 8 having a mirror-finished surface and a surface temperature of 100° C. and pressed into a film of a medium thickness of 500 um.

Measuring of the phase difference dn on the extruded film web 6 is effected by means of a birefringence measuring device 7. One suitable device is an OEM-3-LIN of Messrs. ISEDD (4800 Bielefeld, Eckendorfer Str. 10) and is based on the above-mentioned photoelastic principle. The phase difference measured on the film web 6 is fed into the controller 10 as a local actual value. For the local setting of extrusion nozzle 1, the measured values are compared to the desired values within the controller. Then the controller calculates the relative control values to reset the individual adjusting screws 9 in accordance with the differences in actual and theoretical values and passes them onto the setting elements. The production speed of the film web (which is 1.50 m in width) is 10 m/min. The phase difference dn which is dependent on the bead being kept constantly small amounts to maximum 50 nm ±10% for a film thickness of 500 um.

I claim:

1. Apparatus for the manufacture of smooth-surfaced transparent plastic webs, comprising:

a nozzle having an outlet for introducing flowable plastic material, the nozzle including a control mechanism for adjusting the flow rate of plastic material emerging from points along the nozzle outlet;

a pair of glazing rolls forming a nip into which flowable plastic material is introduced to form a bead at an upper inlet side of the nip, with a web of the plastic material emerging from a lower outlet side of the nip and having a temperature less than a glass transition temperature of the plastic material;

at least one sensor for measuring the birefringence of the web at points along a web width and for generating signals in accordance therewith; and a computer connected to the at least one sensor for determining from said signals a bead height at points along the nip inlet side, the computer connected to the control mechanism for adjusting the flow rate of plastic material to alter the bead height at selected locations along the nip inlet side to produce a substantially uniform bead height therealong.

2. The apparatus according to claim 1, wherein the at least one sensor comprises a plurality of sensors arranged in a line oriented transversely relative to a direction of extruded web travel for determining web birefringence simultaneously at different points along the line.

3. The apparatus according to claim 1, wherein the at least one sensor is moved transversely relative to a direction of travel of the extruded web.

4. A method for producing a smooth-surfaced, thin web of thermoplastic material, comprising the steps of:

A) introducing flowable thermoplastic material to an upper inlet side of a nip formed between a pair of glazing rolls, whereby a bead is formed at the nip inlet side;

B) removing a web of the thermoplastic material from a lower outlet side of the nip, the web having a temperature less than a glass transition temperature of the plastic material;

C) measuring the birefringence in the web at points along the width thereof and generating signals in accordance therewith; and D) controlling the rate of introduction of thermoplastic to the nip inlet in accordance with the generated signals to produce a substantially uniform bead height at points along the nip inlet side.

5. The method according to claim 4, wherein step A comprises discharging thermoplastic material from a nozzle having a regulatable outflow rate, and step D comprises regulating the outflow rate.

6. The method according to claim 4, wherein step C comprises traversing a birefringence sensor transversely across the width of the extruded web.

7. The method according to claim 4, wherein step C comprises measuring the birefringence simultaneously at different points along the width of the extruded web.

8. The method according to claim 4, wherein a thickness of the extruded web varies between 0.05 and 2.0 mm.

9. The method according to claim 4, wherein the thermoplastic material includes aromatics.

10. A method for measuring a height of a bead of flowable thermoplastic material disposed at an inlet side of a nip formed between a pair of glazing rolls, the method comprising the steps of:

(A) measuring the birefringence at points along a width of a web of the thermoplastic material emerging from the nip, while the web is at a temperature less than a glass transition temperature of the thermoplastic material, and generating signals in accordance with the measured birefringence; and (B) delivering said signals to a computer which determines from said signals a bead height at points along the nip inlet side.

* * * * *